Patented Feb. 2, 1932

1,843,677

UNITED STATES PATENT OFFICE

JOSEPH INDERGAND, OF BAAR, SWITZERLAND, ASSIGNOR TO LANDIS & GYR, A. G., OF ZUG, SWITZERLAND, A CORPORATION OF SWITZERLAND

INDUCTION METER

Application filed March 30, 1931, Serial No. 526,229, and in Switzerland March 23, 1928.

The invention relates to a new and useful improvement in magnet cores and more especially to novel and useful improvements in the magnet cores of the driving electromagnets in electricity meters, as well as to improvements in the driving system of such meters.

The present application is in part a continuation of my prior application Ser. No. 348,521 filed March 20, 1929.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, improvements, steps and methods herein shown and described.

The accompanying drawings, referred to herein and constituting a part hereof, illustrate embodiments of the invention, and together with the description, serve to explain the principles of the invention.

Of the drawings:—

Figure 1:
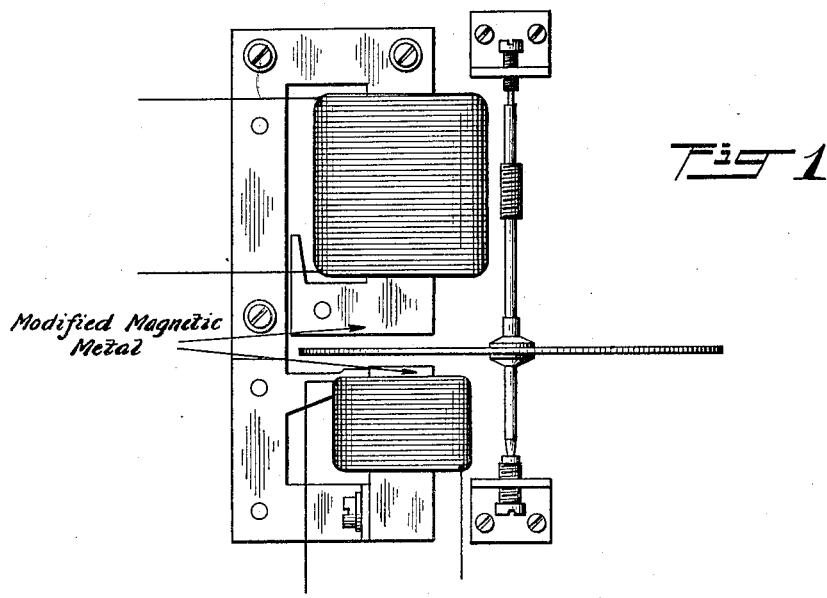
Fig. 1 illustrates a typical watt-hour meter of the Ferraris type, the magnet cores of which are formed, at least in part, of the modified magnetically conducting material.

The cores of the driving electro-magnets of Ferraris type electricity meters, as almost universally constructed, consist of a plurality of thin plates placed together to constitute a magnet core. Due to the complex magnetization curve of the iron heretofore employed in the construction of these cores, the magnetic flux produced by the current flowing in the coil surrounding the cores bears a very complicated relation to the ampere turns of the coil in which the current flows, with the consequent result that a very unsatisfactory error curve is obtained.

The errors may be eliminated quite easily, in the usual construction of meters, for any particular load, but if the meter is adjusted for 100 per cent overload, these errors will be apparent at normal load and the current damping can be compensated for only by a readjustment of the meter. These errors are generally quite large and are generally due to the magnetic shunt in the meter. As is known, the magnetic shunt to the current cores compensates the damping effect of the current driving flux acting on the meter disc to cause its rotation.

It is among the objects of the present invention to provide a magnetic meter core in which the magnetic properties of the shunt are such that the damping effect of the current is compensated for at all loads and a flat performance curve may be obtained indicating a practically correct registration of the energy consumed in the circuit. A further object of the invention is the provision of a novel method by which the magnet cores of electricity meters and other electrical apparatus have their magnet characteristics modified to overcome or compensate for the errors which normally are to be found.

The present invention is particularly directed to and finds its greatest field of use with such induction watt meters and watt-hour meters of the Ferraris type as are of relatively light weight and where the characteristic performance errors have been quite large, heretofore. By reason of the present invention, these light weight meters can be constructed and adjusted to have a characteristic performance curve that is practically accurate and well within the limits of commercial tolerance.

In accordance with the present invention, the magnetic characteristics of the magnetizable metal employed for the core are so changed, by treatment of the core metal, probably causing a modification of the molecular condition of the core metal, that the magnetizing curve of the core metal assumes such a shape as to eliminate the errors normally occurring in the characteristic performance curve.

Briefly, and by way of preliminary summary, the method of the present invention comprises the formation of a considerable number of test magnetic cores from the particular batch of sheet metal to be used in manufacture, subjecting each of these several test cores to a different course of treatment to change the molecular condition of the core metal and thereby modify the magnetizing curve of the core metal, thereafter forming meters or other test instruments from these variously treated cores, and determining the characteristic performance of each, thereby determining which treatment produced the greatest improvement in the finished test instrument and resulted in the greatest degree of accuracy. After these tests have been concluded and the results have been interpreted, the remainder of the batch of sheet metal is formed into magnet cores, and these cores are treated in accordance with that treatment which produced the best results in the test meters. The modified cores are then assembled in the usual manufacturing process to form meters or other instruments as desired.

Preferably the magnetically conducting metal, such as sheet iron, from which the magnetic cores of the driving magnets of the meter are to be made, is modified by mechanical or thermal treatment to effect the desired change in its magnetic properties.

The mechanical treatment of the sheet material may be carried out by hammering or rolling the sheet metal, the exact nature and extent of the treatment being determined on the particular magnetic properties of the sheet iron being so treated.

The thermal method of modifying the molecular arrangement of the magnetic material is preferably carried out by cutting or punching the sheets of iron, or other magnetic material, to form the lamellæ of the core, after which these lamellæ are heated to the temperature found best by the tests outlined above, generally a dull glow, followed by cooling at the predetermined rate.

Figure 2:
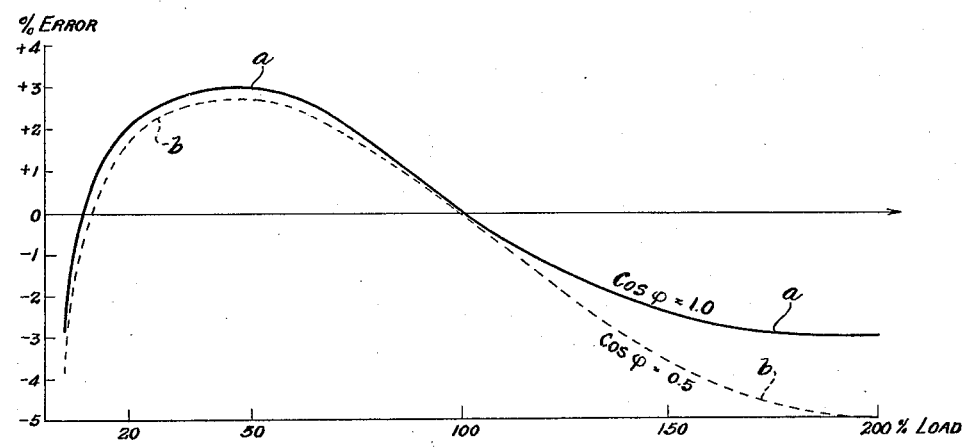
Figs. 2, 3 and 5 are characteristic performance curves of various watt-hour meters.
Figure 3:
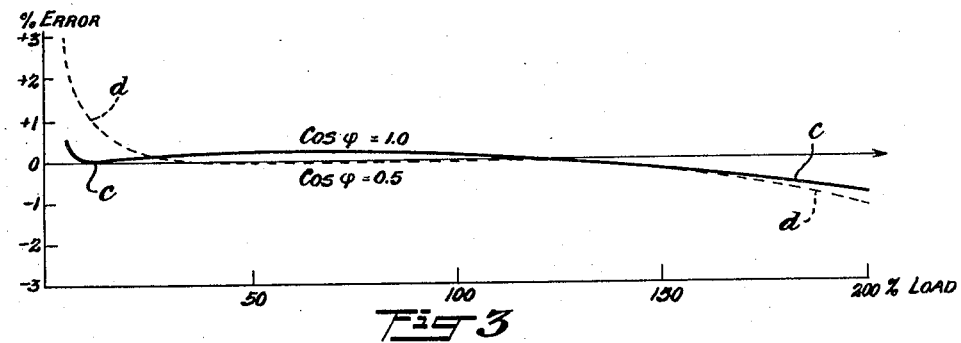

Figs. 2 and 3 are illustrative of the characteristic performance curves, at cos $\phi = 1.0$ and cos $\phi = 0.5$, of meters employing magnet cores untreated and treated in accordance with the present invention, respectively.

In Fig. 2 curve $a$ shows the characteristic performance curve of a watt-hour meter employing untreated core iron with cos $\phi = 1.0$. Curve $b$ is similar with cos $\phi = 0.5$.

In Fig. 3 curve $c$ represents the characteristic performance curve at cos $\phi = 1.0$ of a watt-hour meter employing core iron treated in accordance with the present invention. Curve $d$ is similar to curve $c$, but with cos $\phi = 0.5$.

The cores employed in connection with Fig. 3 were treated as follows:—The sheet iron was punched to form the meter cores, and after having been brought to final shape, the core lamellæ were placed on an anvil and hammered over the surface with a hammer weighing 100 gms. About fifty blows were struck with the hammer, and the core was reduced in thickness by 0.1 mm. However, the iron did not heat up appreciably.

Figure 4:
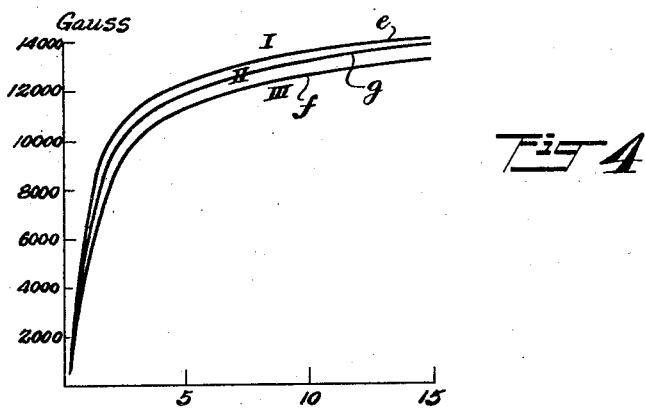
Fig. 4 shows several magnetization curves.
Figure 5:
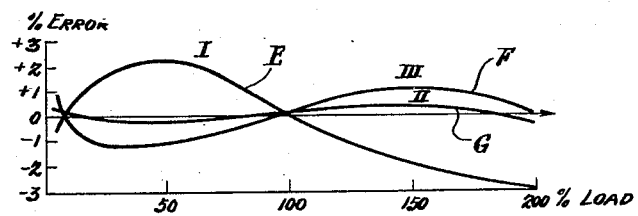

As illustrative of the mechanical modification process found to produce the most perfect characteristic performance curve with cores formed from high-silicon sheet iron, the following example is given, although it should be understood that this particular treatment would not necessarily be the best for any other batch of iron:—By proceeding in accordance with the present invention, it was found that the heating of the cores to 850° C. followed by slow cooling produced the magnetizing curve $e$ of Fig. 4 and watt-hour meters employing this core had an error curve similar to E of Fig. 5.

If the metal core was not slowly cooled but was quenched in cold water, after heating to 850° C., the magnetizing curve $f$ and error curve F result.

Another core was heated to 850° C. and was quenched in oil and this core had a magnetizing curve similar to $g$ and when used in a watt-hour meter gave the error curve G.

The magnetic material employed in carrying out the present invention may vary, but for the formation of cores for electricity meters, such as watt-meters and watt-hour meters, a sheet iron having a high silicon content is preferable.

While the materials of the magnetic shunt to the current core are preferably treated in accordance with the invention as set forth, either or both carriers of the magnetic flux can be treated to modify the magnetic characteristics of the magnetically conducting material, and the current or voltage coil cores may be constructed using a portion of the modified sheet iron and the remainder being formed of unmodified sheet iron. The extent of the treatment and the extent to which the modified magnetically conducting materials are employed in the construction of the magnetic flux carriers will be determined by the magnetic properties of the sheet material employed, the treatment always being directed to change the magnetization curves so that the influence of the varying permeability on the characteristic performance curve is as small as possible.

The invention in its broader aspects is not limited to the specific mechanisms shown and described but departures may be made therefrom within the scope of the accompanying claims without departing from the principles of the invention and without sacrificing its chief advantages.

What I claim is:—

1. The method of building electric induction meters comprising forming a number of sample meter cores from a given batch of iron, subjecting these different samples to different treatments modifying the molecular arrangement of the iron, building a number of test meters out of the different samples, testing the test meters to determine the characteristic performance of each of the test meters, forming meter cores out of the iron thus treated, and treating the entire batch of iron with the same treatment that was given to that batch of iron which produced the meter having the best performance.

2. The method of building electric induction meters comprising forming a number of sample meter cores from a given batch of iron, subjecting these different samples to different heat treatments, building a number of test meters out of the different samples, testing the test meters to determine the characteristic performance of each of the test meters, forming meter cores out of the iron thus treated and treating the entire batch of iron with the same treatment that was given to that batch of iron which produced the meter having the best performance.

3. The method of building electric induction meters comprising forming a number of sample meter cores from a given batch of iron, subjecting these different samples to different mechanical treatments, building a number of test meters out of the different samples, testing the test meters to determine the characteristic performance of each of the test meters, forming meter cores out of the iron thus treated and treating the entire batch of iron with the same treatment that was given to that batch of iron which produced the meter having the best performance.

4. The method of building electric induction apparatus comprising forming a number of sample magnet cores from a given batch of iron, subjecting these different samples to different treatments modifying the molecular arrangement of the iron, building a number of test apparatus out of the different samples, testing the test apparatus to determine the characteristic performance of each of the test apparatus, forming magnet cores out of the iron thus treated, and treating the entire batch of iron with the same treatment that was given to that batch of iron which produced the apparatus having the best performance.

In testimony whereof, I have signed my name to this specification.

JOSEPH INDERGAND.